(12) United States Patent
Min et al.

(10) Patent No.: US 8,523,958 B2
(45) Date of Patent: Sep. 3, 2013

(54) FABRICATION OF LITHIUM SECONDARY BATTERY

(75) Inventors: Jae Yun Min, Daejeon (KR); Jeon Keun Oh, Daejeon (KR); Eun Joo Lee, Daejeon (KR); Tae Kon Ko, Chungcheongnam-do (KR)

(73) Assignee: SK Innovation Co., Ltd., Seoul (KR)

( * ) Notice: Subject to any disclaimer, the term of this patent is extended or adjusted under 35 U.S.C. 154(b) by 651 days.

(21) Appl. No.: 12/526,569

(22) PCT Filed: Feb. 14, 2008

(86) PCT No.: PCT/KR2008/000866
§ 371 (c)(1),
(2), (4) Date: Aug. 10, 2009

(87) PCT Pub. No.: WO2008/100091
PCT Pub. Date: Aug. 21, 2008

(65) Prior Publication Data
US 2010/0024204 A1 Feb. 4, 2010

(30) Foreign Application Priority Data
Feb. 16, 2007 (KR) .................. 10-2007-0016614

(51) Int. Cl.
*H01M 4/82* (2006.01)
(52) U.S. Cl.
USPC .......................................... 29/623.2

(58) Field of Classification Search
USPC ........................................ 29/623.2
See application file for complete search history.

(56) References Cited

U.S. PATENT DOCUMENTS

| 6,150,050 | A | 11/2000 | Mathew et al. | |
|---|---|---|---|---|
| 2005/0084765 | A1* | 4/2005 | Lee et al. | 429/329 |
| 2005/0244705 | A1* | 11/2005 | Cherng et al. | 429/52 |
| 2006/0240327 | A1* | 10/2006 | Xu et al. | 429/324 |
| 2007/0042269 | A1* | 2/2007 | Chang et al. | 429/231.1 |

FOREIGN PATENT DOCUMENTS

| JP | 62211873 A | 9/1987 |
|---|---|---|
| JP | 2001-325988 A | 11/2001 |
| KR | 20000020534 A | 4/2000 |

* cited by examiner

*Primary Examiner* — Karie O'Neill Apicella

(57) ABSTRACT

A method of fabricating a lithium secondary battery, which improves charge-discharge characteristics, lifespan, and temperature characteristics of the battery and which includes interposing a separator between a positive electrode plate and a negative electrode plate, thus manufacturing an electrode assembly; housing the electrode assembly in a battery case, introducing an additive-containing electrolytic solution, and then sealing the battery case; subjecting the sealed battery case to pre-charging, and then removing gas generated by the pre-charging; subjecting the battery case to formation; and removing gas generated by the formation, wherein the additive is one or more selected from among $LiF_2BC_2O_4$, 3,9-divinyl-2,4,8,10-tetraoxaspiro[5,5]undecane, $LiB(C_2O_4)_2$, poly(ethyleneglycol)borate and derivatives thereof, halogen-substituted carbonate, and vinyl silane, and the pre-charging is conducted in a range of 10% or less of a battery capacity.

3 Claims, 4 Drawing Sheets

FABRICATION OF LITHIUM SECONDARY BATTERY

RELATED APPLICATION

This is a §371 of International Application No. PCT/KR2008/000866, with an international filing date of Feb. 14, 2008 (WO 2008/100091 A1, published Aug. 21, 2008), which is based on Korean Patent Application No. 10-2007-0016614 filed Feb. 16, 2007.

TECHNICAL FIELD

The disclosure relates to a method of fabricating a lithium secondary battery, and more particularly, to a method of fabricating a lithium secondary battery, by which the battery is improved in terms of charge-discharge characteristics, lifespan, and temperature characteristics.

BACKGROUND ART

Recently, as portable electronic products, including camcorders, mobile phones, and notebook computers, are required to be smaller and lighter and to have increased functionality, the demand for high-performance small batteries, which are capable of being used for an extended time and are lightweight and highly reliable, is increasing. Corresponding to such demand, lithium secondary batteries are receiving great attention.

The lithium secondary battery is classified into, depending on the type of electrolyte, a lithium metal battery, a lithium ion battery, and a lithium polymer battery, and further into, depending on the type of package for sealing an electrode assembly, a rectangular battery, a cylindrical battery, and a pouch battery. The pouch battery is mainly used for lithium polymer secondary batteries, and the fabrication method thereof follows.

That is, positive and negative electrode active materials are applied on both surfaces of a collector to manufacture electrode plates, between which a separator is then interposed and stacked, after which a bicell lamination process is carried out, thus manufacturing an electrode assembly. Subsequently, a plasticizer is extracted from the electrode assembly, taps are welded to leads of the electrode assembly, and then the electrode assembly is housed in a pouch case. After the electrode assembly is housed in the pouch case, an electrolytic solution is introduced into the electrode space in the battery case such that the electrode assembly is impregnated with the electrolytic solution.

After the completion of the introduction of the electrolytic solution, the open edge of the pouch is covered and is then primarily sealed. Subsequently, an aging process for stabilizing the battery is conducted, after which pre-charging is conducted to a state-of-charge (SOC) of 10% or less. The pre-charging process prevents the battery case from breaking due to the gassing in the battery case in the event of over-charge of the battery or the like. Through the pre-charging process, the gas is formed in the pouch case. The gas thus formed is removed through an outlet which is open or cut, and the gas outlet is thermally fused and is thus sealed. The process of exhausting the gas from the electrode space and thermally fusing the gas outlet is typically referred to as degassing. These days, as a styrene butadiene rubber/carboxyl methyl cellulose (SBR/CMC) system, which is a water-based binder for a negative electrode, is applied to rectangular batteries, the degassing process may be chiefly conducted, or a process of adding a filling liquid in several separate stages may be applied.

In the lithium secondary battery, at the time of pre-charging, lithium ions from lithium metal oxide used for a positive electrode are moved to a carbon (crystalline or amorphous) electrode, serving as a negative electrode, to thus be inserted into the carbon of the negative electrode. Then, the lithium ions react with the carbon negative electrode, thus forming $Li_2CO_3$, $Li_2O$, and $LiOH$, which are then formed into a thin film, called an SEI (solid electrolyte interface), on the surface of the negative electrode. Such an SEI has an influence on the movement of ions and electric charges to thus result in changes in the performance of the battery. The properties of the film are known to be greatly changed depending on the type of solvent used in the electrolytic solution and the properties of the additive.

When the lithium secondary battery is continuously used for an extended time, or is left to stand at high temperatures, a swelling phenomenon, in which the battery swells due to gassing, occurs. The amount of as that is generated is known to be dependent on the state of SEI. Hence, in order to prevent the swelling phenomenon at high temperatures, techniques for inducing the stable formation of the SEI are required. Further, known are methods of improving the high-temperature lifespan of the lithium secondary battery by adding a negative electrode SEI improver, such as $LiF_2BC_2O_4$, 3,9-divinyl-2,4,8,10-tetraoxaspiro[5,5]undecane, $LiB(C_2O_4)_2$, poly(ethyleneglycol)borate and derivatives thereof, halogen-substituted carbonate, and vinyl silane, to the electrolyte.

However, because the aforementioned negative electrode SEI improver has lower reducibility than general additives such as VC (vinylene carbonate) or VEC (vinyl ethylene carbonate), reduction may be conducted only when the voltage of the negative electrode is further decreased. Thus, when pre-charging to SOC of 10% or less, and then degassing as in the conventional degassing process are conducted, the additive is not 100% reduced, and thus gas is additionally generated in a subsequent formation process, undesirably causing swelling problems.

SUMMARY

Accordingly, a method of fabricating a lithium secondary battery is provided, in which a negative electrode SEI improver is used to improve the high-temperature lifespan of the lithium secondary battery, and not only first degassing after a pre-charging process but also second degassing after a formation process are conducted, thereby decreasing a swelling phenomenon and exhibiting superior charge-discharge characteristics, lifespan, and temperature characteristics.

A method of fabricating a lithium secondary battery is provided, which comprises interposing a separator between a positive electrode plate and a negative electrode plate, this manufacturing an electrode assembly; housing the electrode assembly in a battery case, introducing an additive-containing electrolytic solution, and then sealing the battery case; subjecting the sealed battery case to pre-charging, and then removing gas generated by the pre-charging; subjecting the battery case to formation; and removing gas generated by the formation, wherein the additive is one or more selected from among $LiF_2BC_2O_4$, 3,9-divinyl-2,4,8,10-tetraoxaspiro[5,5]undecane, $LiB(C_2O_4)_2$, poly(ethyleneglycol)borate and derivatives thereof, halogen-substituted carbonate, and vinyl silane, and the pre-charging is conducted in a range of 10% or less of a battery capacity.

Compared to conventional methods, in which VC (vinylene carbonate) or VEC (vinyl ethylene carbonate) is used as an additive and degassing is conducted only after pre-charging to SOC of 10% or less, the method of fabricating a lithium secondary battery is advantageous in that a high-temperature lifespan improver, acting to form an SEI of a negative electrode, is added, and first degassing after a pre-charging process to SOC of 10% or less and second degassing after a formation process are conducted. Thereby, when the lithium secondary battery is fabricated, the high-temperature lifespan of the battery is increased, and as well, a swelling phenomenon, caused by the additional generation of gas, can be effectively eliminated.

DETAILED DESCRIPTION

Hereinafter, a detailed description will be given of various examples and aspects of the disclosure.

In order to solve problems related to the occurrence of a swelling, phenomenon at the time of subjecting a lithium secondary battery, the electrolyte of which is added with an SEI improver for improving a high-temperature lifespan, to a formation process, the disclosure provides a method of fabricating a lithium secondary battery, in which degassing is conducted not only after pre-charging to 10% or less of a battery capacity but also after a formation process.

Figure 3:
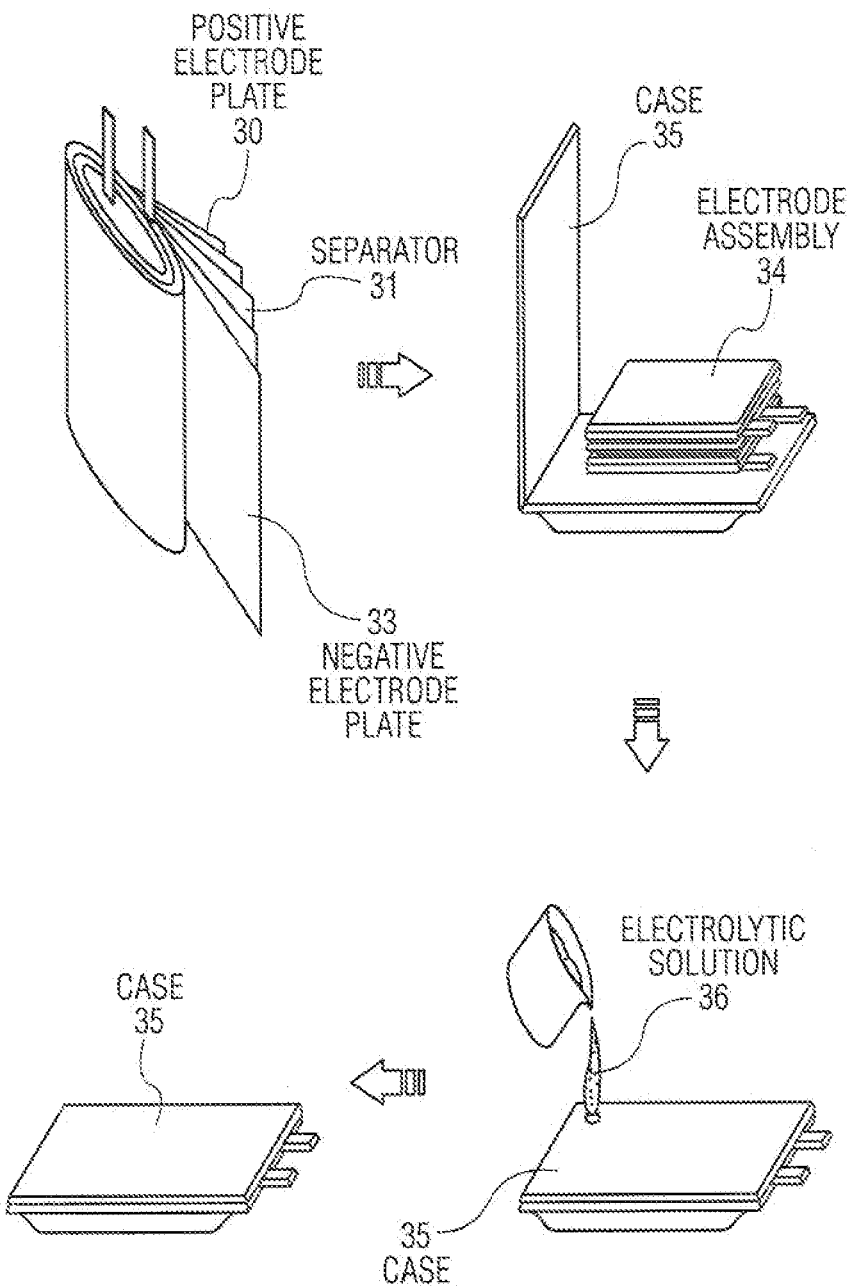
FIG. 3 shows an exemplary embodiment of a method of fabricating a lithium battery.

As shown in FIG. 3, the method of fabricating the lithium secondary battery includes interposing a separator 31 between a positive electrode plate 32 and a negative electrode plate 33, thus manufacturing an electrode assembly 34. The electrode assembly comprises positive/negative electrode active materials and a collector, and may be manufactured through methods typical in the art. For example, a negative electrode film and a positive electrode film are manufactured using the positive/negative electrode active materials, and a separator film, which is an insulator, is manufactured. Then, the positive/negative electrode films are pre-treated, coated, and dried, after which the positive/negative electrode films are applied on the collector and are wound or stacked, along with the separator film, which is the insulator, thus fabricating the battery. As such, the positive/negative electrode active materials, the collector, and the separator film may be of types that are typical in the art.

Further, the method includes housing the electrode assembly in a battery case 35, introducing an additive-containing electrolytic solution 36, and sealing the battery case 35. The battery case 35 is used to package the battery, and may be a rectangular type or a pouch type. When the battery case is a pouch type, an aluminum laminate pouch may be used, and the aluminum laminate pouch, which is a film about 100 μm thick composed of nylon-aluminum-polypropylene layers, is thermally fused by heat of 160~210° C. and pressure of 1~3 kg/cm$^3$, and is thus sealed.

In the electrolytic solution 36 used in the method of fabricating the lithium secondary battery, a solvent may include, as a carbonate-based solvent, one or a mixture of two or more selected from among EC (ethylene carbonate), DMC (dimethyl carbonate), EMC (ethyl methyl carbonate), PC (propylene carbonate), and DEC (diethyl carbonate), and a lithium salt may include one or more selected from among $LiPF_6$, $LiBF_4$, $LiClO_4$, $LiN(SO_2CF_3)_2$, $Li_2B_{12}F_9H_3$, and $LiN(SO_2CF_2CF_3)_2$, which are typically used for lithium secondary batteries, and may have a concentration of 0.5~1.5 M.

In the method of fabricating the lithium secondary battery, the additive, which is added to the electrolyte, is used to improve the negative electrode SEI in order to suppress the increase in the ASI (area specific impedance) at the time of leaving the battery to stand at high temperatures. Examples of the additive include $LiF_2BC_2O_4$, 3,9-divinyl-2,4,8,10-tetraoxaspiro[5,5]undecane, $LiB(C_2O_4)_2$, poly(ethyleneglycol) borate and derivatives thereof, halogen-substituted carbonate, and vinyl silane, which may be used alone or in mixtures of two or more.

The additive is used in an amount of 0.1~10.0 wt %, and preferably 0.5~3.0 wt %, based on the amount of a final electrolytic solution. When the amount of the additive is less than 0.1 wt %, the high-temperature lifespan improvement effect is insignificant. On the other hand, when the amount thereof exceeds 10.0 wt %, the amount of gas generated by the pre-charging is too much, and thus the surface of the electrode is not uniformly charged.

The above additive is responsible for improving the high-temperature lifespan, but the reducibility thereof is lower than general additives. Therefore, when pre-charging is conducted to SOC of 10% or less of the battery capacity, as in conventional methods, swelling occurs in the formation process, and thus initial resistance is increased and the battery cannot be placed in the space of the battery case. Using the above additive, pre-charging and additional degassing, mentioned below, are essentially required.

In order to assure a sufficient period of time to uniformly distribute the introduced electrolytic solution throughout the electrodes of the electrode assembly in a sealed state, an aging process may be performed for up to 72 hours before the pre-charging. This aging process is conducted under conditions of atmospheric pressure and 20~60° C.

The pre-charging is performed to primarily charge the electrode assembly using the electrode terminals of the electrode assembly, thereby activating the active materials while generating the gas in the battery in advance and removing it. The pre-charging for gas exhaust is conducted only to 10% or less of the capacity of the lithium secondary battery in order to shorten the processing time. It is preferred that the pre-charging is conducted under conditions of current of 0.1~1 C and voltage of 3.6~4.4 V. The aforementioned unit "C" refers to a battery's "C-Rate" or hourly rate. C-rate is used to describe, for example, the effective time of a battery. C-Rate (C)=Charge or Discharge Current (A)/Rated Capacity of Battery (Ah).

The degassing is performed to remove the gas in the battery, generated by the pre-charging, and includes opening the battery or cutting a portion of the battery case, applying a vacuum of ~750 mmHg for 10 sec, thermally sealing the opened portion of the battery case, and setting the pressure to atmospheric pressure.

Alternatively, the degassing may be carried out using a gas chamber connected to the battery case for receiving the electrode assembly. Specifically, the gas generated by the pre-charging may be exhausted into the gas chamber, the connection path may be sealed, and then the gas chamber may be cut, thereby removing the gas.

The formation is a process of charging the lithium secondary battery in a discharge state to thus activate it, and is typically conducted in a manner of conducting a full charge at a current of 0.2 C, an OCV (open circuit voltage) defect detection while aging is carried out, a full discharge to thus determine the discharge capacity, and charge to 50% of the capacity for loading. However, the disclosure is not limited thereto, and various methods of formation, known in the art, may be applied.

After the formation process, the degassing is performed to additionally remove the gas generated in the formation process due to the low reducibility of the additive, and may be conducted in the same manner as the degassing procedure after the pre-charging, thus eliminating the gas from the battery case.

Alternatively, the degassing may be conducted using the gas chamber. Specifically, two gas chambers may be formed at both sides of the battery, one gas chamber may be cut at the time of first degassing by the pre-charging, thus removing the gas, and the other gas chamber may be cut at the time of second degassing after the formation process, thereby removing the gas.

A better understanding of the aspects of the disclosure may be obtained in light of the following examples, which are set forth to illustrate, but are not to be construed to be limiting.

Example 1

As a positive electrode active material and a positive electrode conductive material, spinel type $LiMn_2O_4$ and acetylene black were used, respectively, and graphite was used as a negative electrode active material. An electrolytic solution, obtained by dissolving 1M $LiPF_6$ salt in an organic solvent mixture of EC:EMC at 3:7, was used. As a positive electrode binder, PVDF (polyvinylidene fluoride) was used, and as a negative electrode binder, an SBR/CMC (styrene butadiene rubber/carboxyl methyl cellulose) system was used. A pouch was formed of aluminum, and had a thickness of 120 μm. A separator was a polyethylene separator.

In order to manufacture a positive electrode plate, the positive electrode active material, the conductive material, and the binder were added at a weight ratio of 94:3:3 to a binder solution (an NMP (N-methyl pyrrolidone) solvent containing 10 wt % binder), and were then mixed together, thus manufacturing the electrode plate having a loading level of 23 mg/cm². In order to manufacture a negative electrode plate, the negative electrode active material, SBR, and CMC were added at a weight ratio of 97.5:1.5:1 to a CMC aqueous solution (containing 10 wt % CMC), and were then mixed together, thus manufacturing the electrode plate having a loading level of 10 mg/cm².

A separator was interposed between the positive electrode plate and the negative electrode plate, followed by conducting winding and compression, thus manufacturing an electrode assembly. The electrode assembly was housed in a battery case, after which an electrolytic solution, obtained by dissolving 1.0 M $LiPF_6$ as an electrolytic salt in a solvent mixture of EC (ethylene carbonate):EMC (ethyl methyl carbonate) at a weight ratio of 3:7 and then adding 3.0 wt % of $LiF_2BC_2O_4$ based on the amount of a final electrolytic solution, was introduced into the battery, and then the battery case was sealed.

Figure 4:
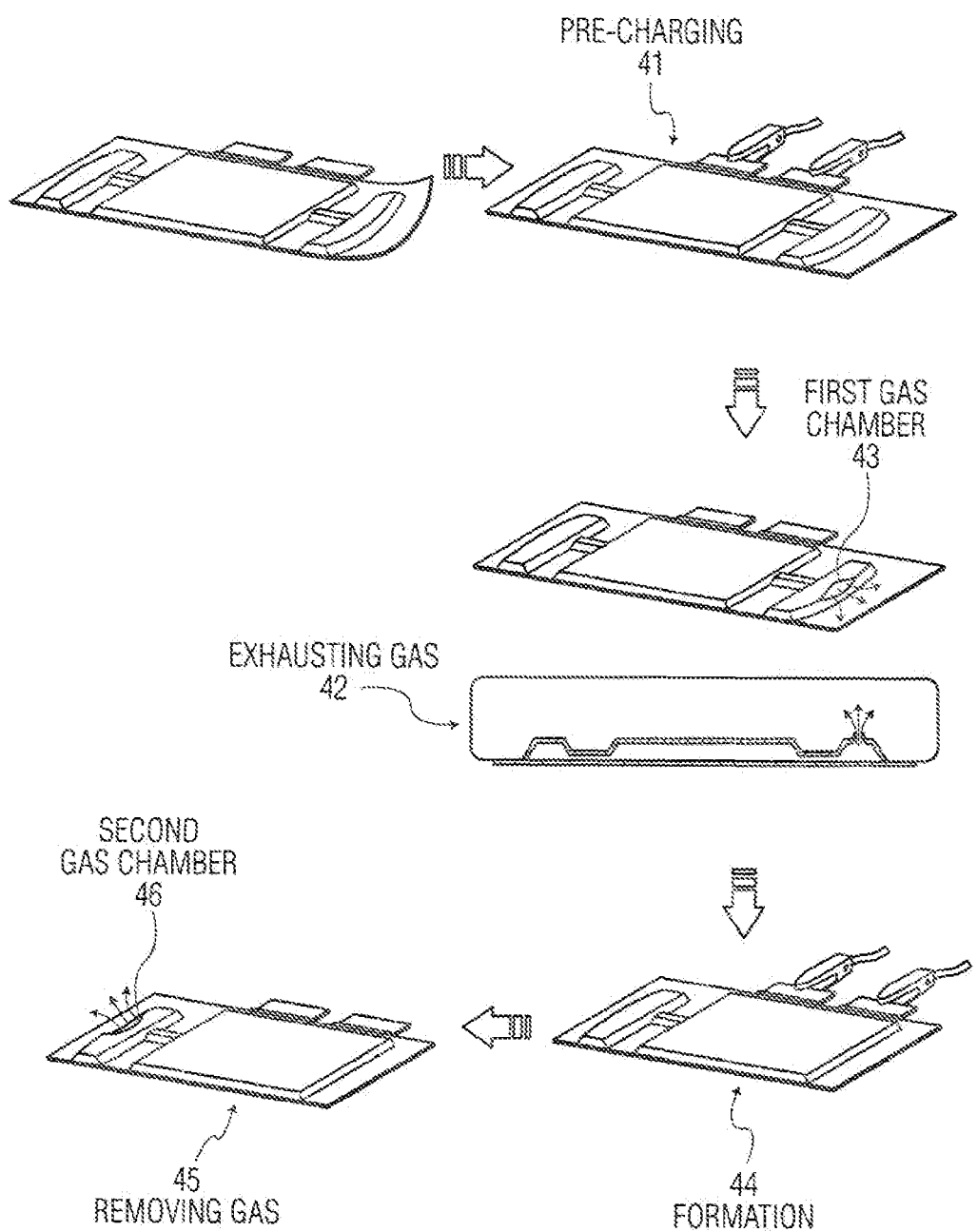
FIG. 4 shows an exemplary embodiment of a method of fabricating a lithium battery.

As shown in FIG. 4, using electrode terminals mounted to the positive and negative electrode plates of the electrode assembly, the electrode assembly was subjected to pre-charging 41. The pre-charging 41 was conducted to 10% of a battery capacity under conditions of current of 0.1~1 C and voltage of 3.6~4.4 V through constant current/constant voltage-regulated charging.

The gas generated by the pre-charging 41 was exhausted a first time 42 into a first gas chamber 43 via a gas chamber connection path, the connection path was thermally fused, the first gas chamber 43 was cut, and then a formation process 44 was conducted in a manner of full charge-full discharge-50% charge. Through this formation process, the generation of the gas in the battery case was observed. Then, the generated was exhausted a second time 45 into a second gas chamber 46, a connection path between the second gas chamber 46 and the battery case was thermally fused and sealed, and the second gas chamber 46 was cut.

Figure 1:
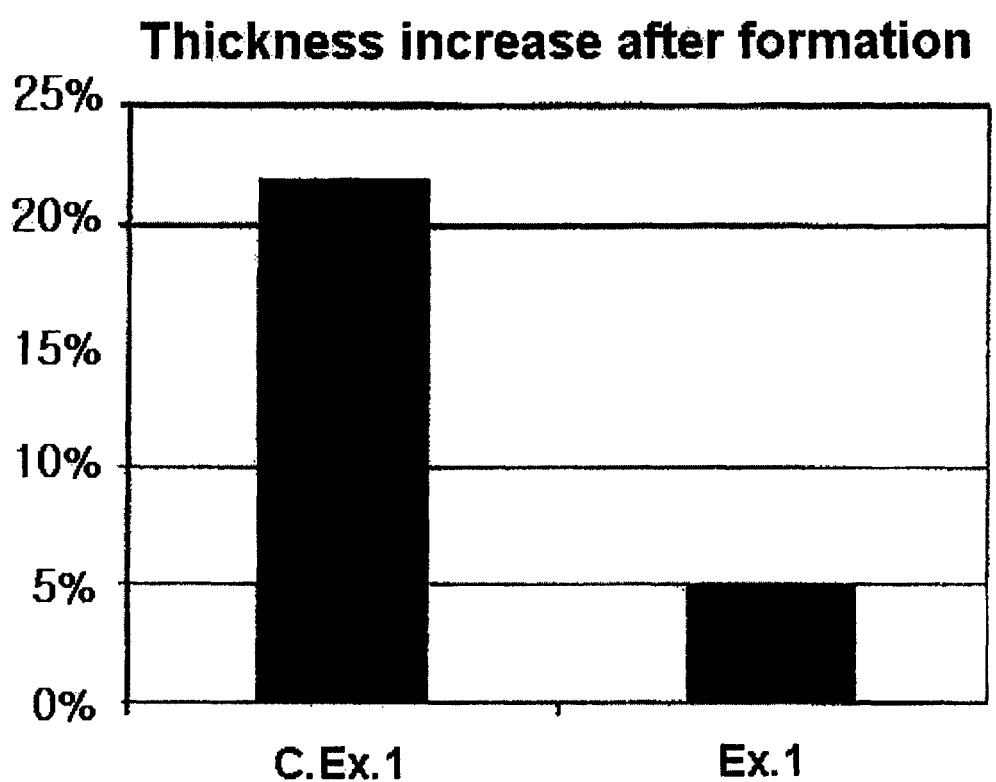
FIG. 1 is a graph illustrating the increase in the thickness of the lithium secondary battery fabricated through the method according to the disclosure and the lithium secondary battery fabricated through a conventional method.
Figure 2:
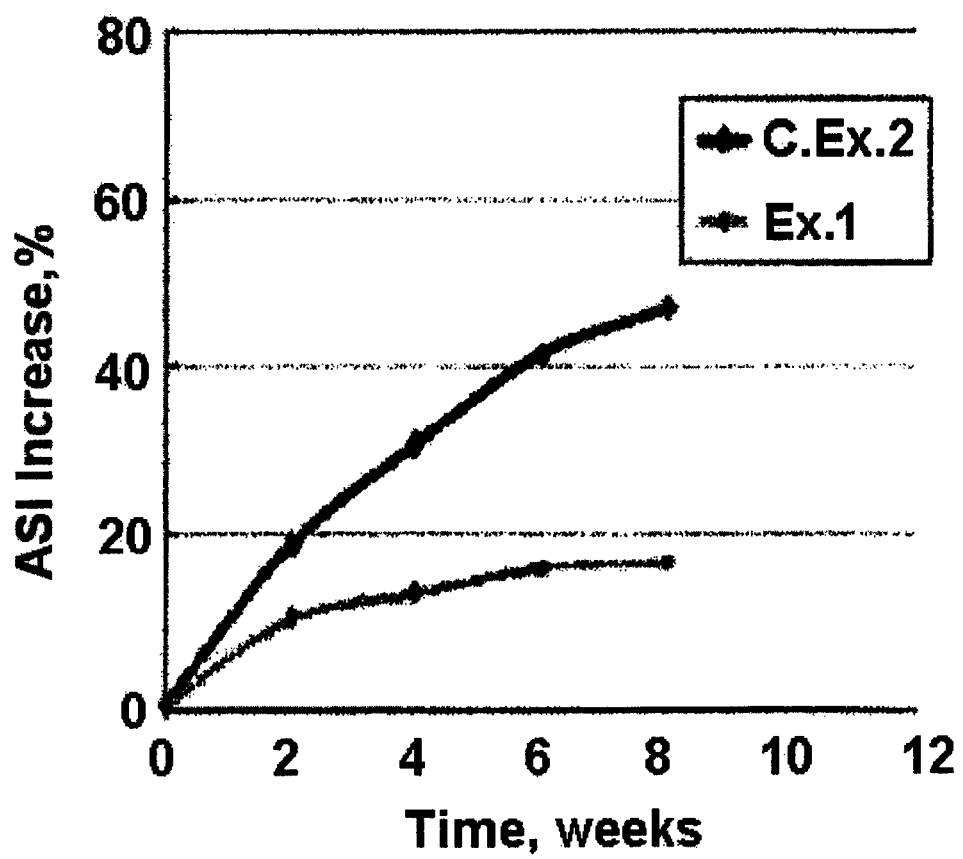
FIG. 2 is a graph illustrating the increase in ASI (area specific impedance) over time when the lithium secondary battery fabricated through the method according to the disclosure and the lithium secondary battery fabricated using a conventional additive are respectively left to stand at high temperatures.

The change in thickness of the battery thus fabricated was determined before and after the formation process 44. The thickness increase thereof is shown in FIG. 1. Further, the battery was left to stand at a high temperature of 55° C., and ASI (area specific impedance) was measured every 2 weeks, and thus the change in ASI over time was observed. The results are shown in FIG. 2.

Comparative Example 1

A lithium secondary battery was fabricated in the same manner as in Example 1, with the exception that an additional degassing procedure was not conducted after the formation process. The change in thickness of the battery thus fabricated was determined before and after the formation process. The thickness increase thereof is shown in FIG. 1.

Comparative Example 2

A lithium secondary battery was fabricated in the same manner as in Example 1, with the exception that VC (vinylene carbonate), as the additive, was used in an amount of 3.0 wt % based on the amount of a final electrolytic solution. The battery thus fabricated was left to stand at a high temperature of 55° C., and ASI was measured every 2 weeks, and thus the change in ASI over time was observed. The results are shown in FIG. 2.

As is apparent from FIG. 1, the thickness of the lithium secondary battery fabricated through the conventional method was increased by about 22% of the initial thickness. However, in the lithium secondary battery that underwent a two-step degassing procedure according to the method of the disclosure, the thickness thereof was increased by 5% or less of the initial battery thickness. Accordingly, it is shown that the swelling phenomenon is remarkably decreased through degassing, compared to the battery resulting from the conventional method.

As is apparent from FIG. 2, even if the same two-step degassing procedure is conducted, when the conventional additive, for example, VC or VEC, is used, instead of the additive of the present disclosure, for example, $LiF_2BC_2O_4$, 3,9-divinyl-2,4,8,10-tetraoxaspiro[5,5]undecane, $LiB(C_2O_4)_2$, poly(ethyleneglycol)borate and derivatives thereof, halogen-substituted carbonate, and vinyl silane, the interval between the electrodes is increased at the time of leaving the battery to stand at high temperatures, undesirably increasing ASI. Accordingly, it is shown that the lifespan of the lithium secondary battery using the $LiF_2BC_2O_4$ additive according to the method of the present disclosure is prolonged at high temperatures, compared to that of the conventional lithium secondary battery using an additive such as VC.

The characteristics disclosed in the description above, the drawings and claims can be relevant individually or in combination for the realization of the aspects disclosed and its various forms, as well as in any variations, changes, omissions or additions thereof, without departing, from the spirit and scope of the appended claims.

The invention claimed is:

1. A method of fabricating a lithium secondary battery, comprising:
    interposing a separator between a positive electrode plate and a negative electrode plate, thus manufacturing an electrode assembly;
    housing the electrode assembly in a battery case, introducing an additive-containing electrolytic solution, and then sealing the battery case;
    subjecting the sealed battery case to pre-charging, and then removing gas generated by the pre-charging;
    subjecting the battery case to formation; and
    removing gas generated by the formation,
    wherein the additive is one or more selected from the group consisting of $LiF_2BC_2O_4$, 3,9-divinyl-2,4,8,10-tetraoxaspiro[5,5]undecane, $LiB(C_2O_4)_2$, poly(ethyleneglycol)borate and vinyl silane, and
    the pre-charging is conducted in a range of 10% or less of the lithium secondary battery capacity,
    wherein the pre-charging is conducted under conditions of current of 0.1~1 C and voltage of 3.6 to less than 4.4 V.

2. The method according to claim 1, wherein:
    the battery case is connected with a first as chamber and a second gas chamber through respective connection paths,
    the removing gas generated by the pre-charging is conducted by exhausting the gas into the first gas chamber, thermally compressing and sealing the connection path between the first gas chamber and the battery case, and then eliminating the first gas chamber from the battery case, and
    the removing gas generated by the formation is conducted by exhausting the gas into the second gas chamber, thermally compressing and sealing the connection path between the second gas chamber and the battery case, and then eliminating the second gas chamber from the battery case.

3. The method according to claim 1, wherein the additive is used in an amount of 0.1~10.0 wt % based on an amount of a final electrolytic solution.

* * * * *

UNITED STATES PATENT AND TRADEMARK OFFICE
CERTIFICATE OF CORRECTION

| | |
|---|---|
| PATENT NO. | : 8,523,958 B2 |
| APPLICATION NO. | : 12/526569 |
| DATED | : September 3, 2013 |
| INVENTOR(S) | : Min et al. |

It is certified that error appears in the above-identified patent and that said Letters Patent is hereby corrected as shown below:

In the Specification

<u>In Column 4</u>

At line 3, please change "$kg/cm^3$" to -- $kg_f/cm^3$ --.

Signed and Sealed this
Twenty-fifth Day of March, 2014

Michelle K. Lee
*Deputy Director of the United States Patent and Trademark Office*